United States Patent
Abene et al.

(10) Patent No.: US 9,848,324 B1
(45) Date of Patent: Dec. 19, 2017

(54) MOBILE DEVICE PASSWORD MANAGEMENT AND ESCROW WITH KEYFOB

(71) Applicant: Intersections, Inc., Chantilly, VA (US)

(72) Inventors: Mark Abene, San Jose, CA (US); Seyed Mojtaba Ghazitabrizi, Sunnyvale, CA (US); Konstantin Bokarius, Sunnyvale, CA (US); Henry Yei, San Jose, CA (US)

(73) Assignee: Intersections Inc., Chantilly, VA (US)

( * ) Notice: Subject to any disclaimer, the term of this patent is extended or adjusted under 35 U.S.C. 154(b) by 0 days.

(21) Appl. No.: 15/620,833

(22) Filed: Jun. 13, 2017

(51) Int. Cl.
   *H04L 29/06* (2006.01)
   *H04W 12/04* (2009.01)
   *H04W 12/06* (2009.01)

(52) U.S. Cl.
   CPC ............ *H04W 12/04* (2013.01); *H04L 63/06* (2013.01); *H04L 63/083* (2013.01); *H04L 63/0853* (2013.01); *H04W 12/06* (2013.01); *H04L 2463/082* (2013.01)

(58) Field of Classification Search
   CPC ... H04L 63/06; H04L 63/083; H04L 63/0853; H04W 12/06
   See application file for complete search history.

(56) References Cited

U.S. PATENT DOCUMENTS

2014/0156993 A1* 6/2014 Yau .................. H04L 63/083
                                                   713/168

FOREIGN PATENT DOCUMENTS

WO   WO2009/048191 A1 *  4/2009  ............. G06F 21/31

OTHER PUBLICATIONS

Xunhua Wang, An Intrusion-Tolerant Password Authentication System, Dec. 2003, IEEE, ISBN 0-7695-2041-3.*

* cited by examiner

*Primary Examiner* — Jeffrey Pwu
*Assistant Examiner* — Thong Truong
(74) *Attorney, Agent, or Firm* — Richard B. Main; Main Law Cafe

(57) ABSTRACT

Physical security methods and equipment are applied to mobile devices that use multi-factor authentication mobile apps. Herein, a password management mobile app physically escrows each encrypted password that must be stored into two parts. These are then distributed between two separate, independent physical devices. Only one of those parts is kept only in a separate user gadget like a keyfob. Any reconstitution of each password after decryption requires that the user have on-hand both the mobile device and the separate user gadget. Such reconstitution is one password at a time, and only as needed, and released for use in remote authentication with a master user password entry.

4 Claims, 8 Drawing Sheets

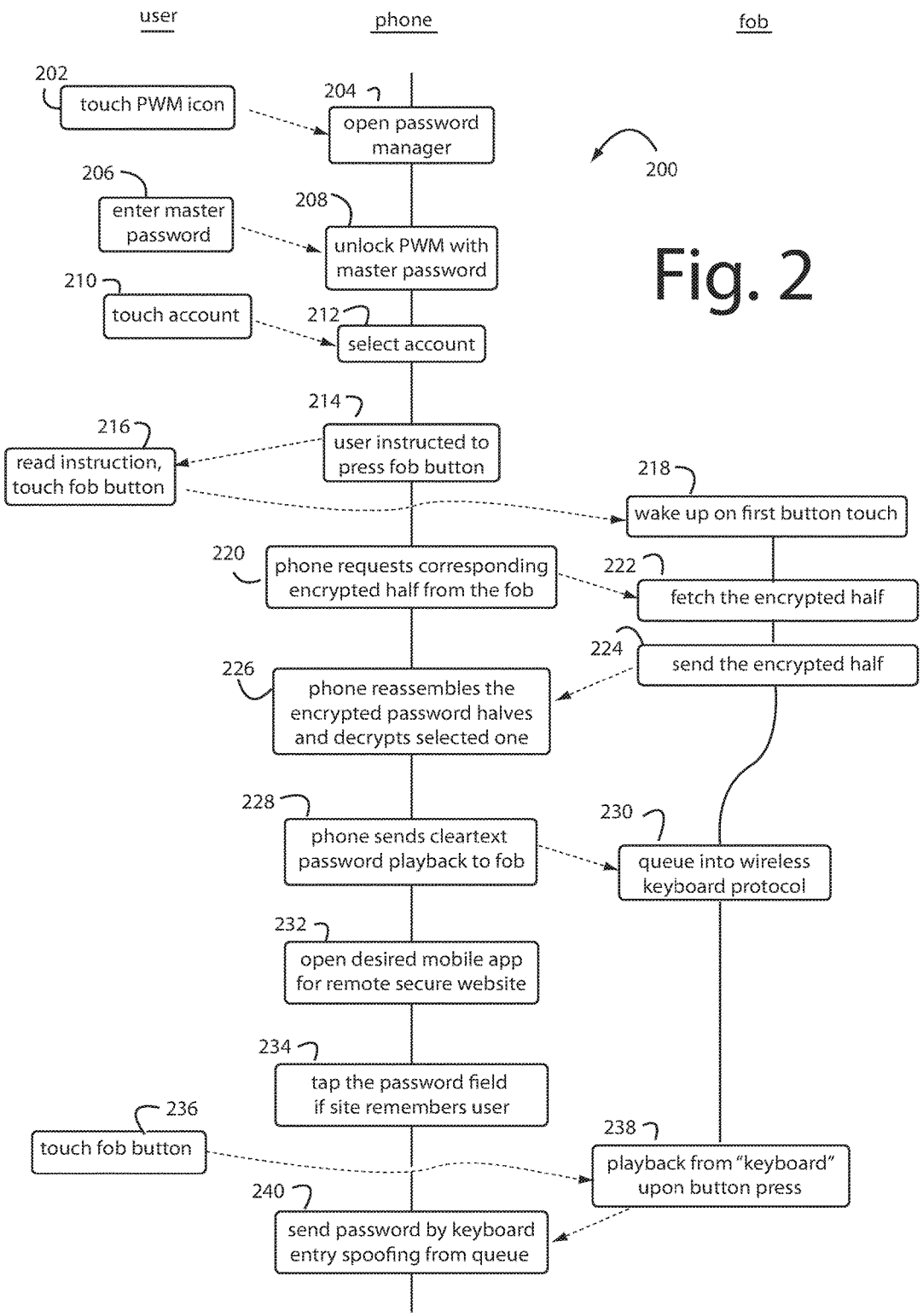

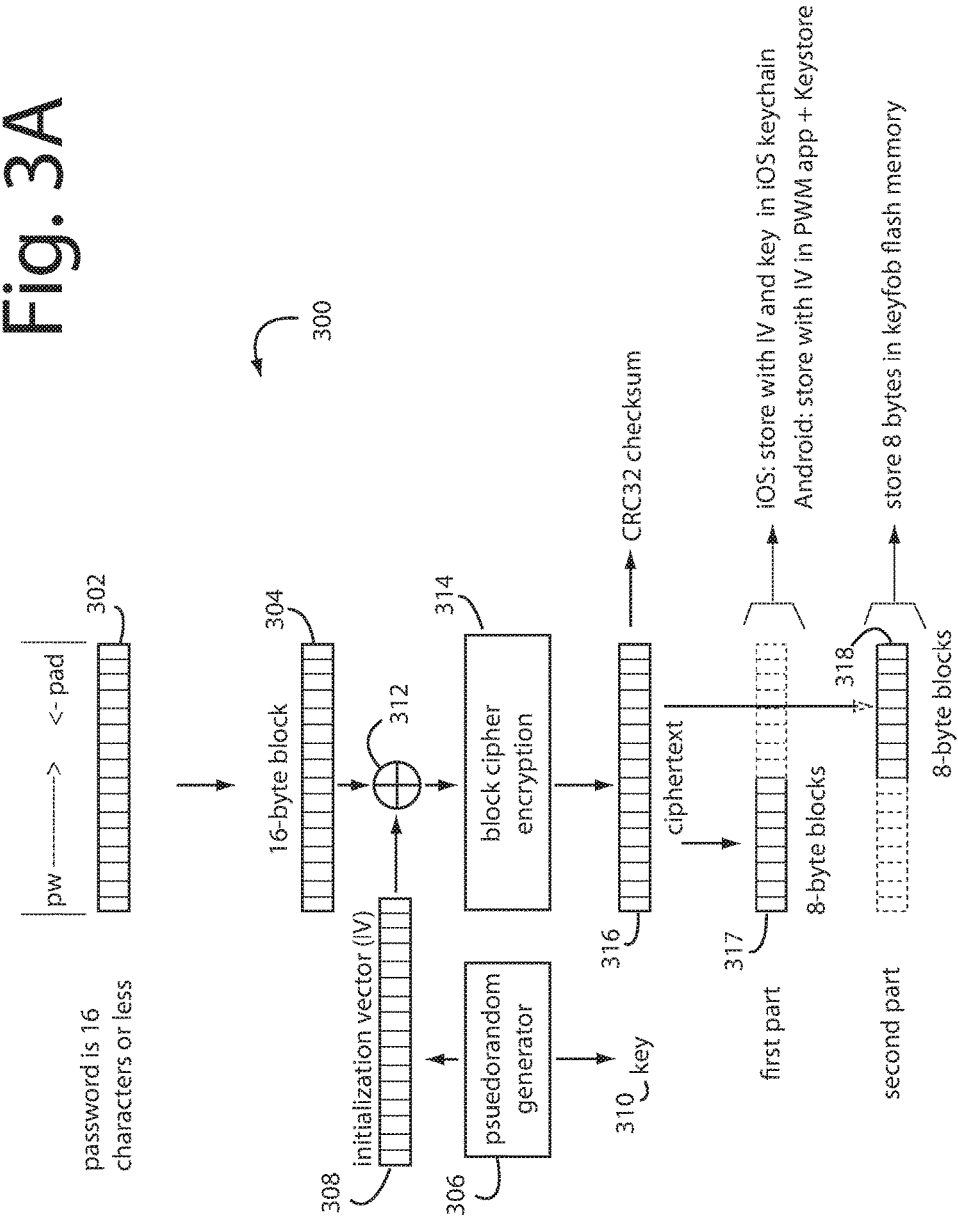

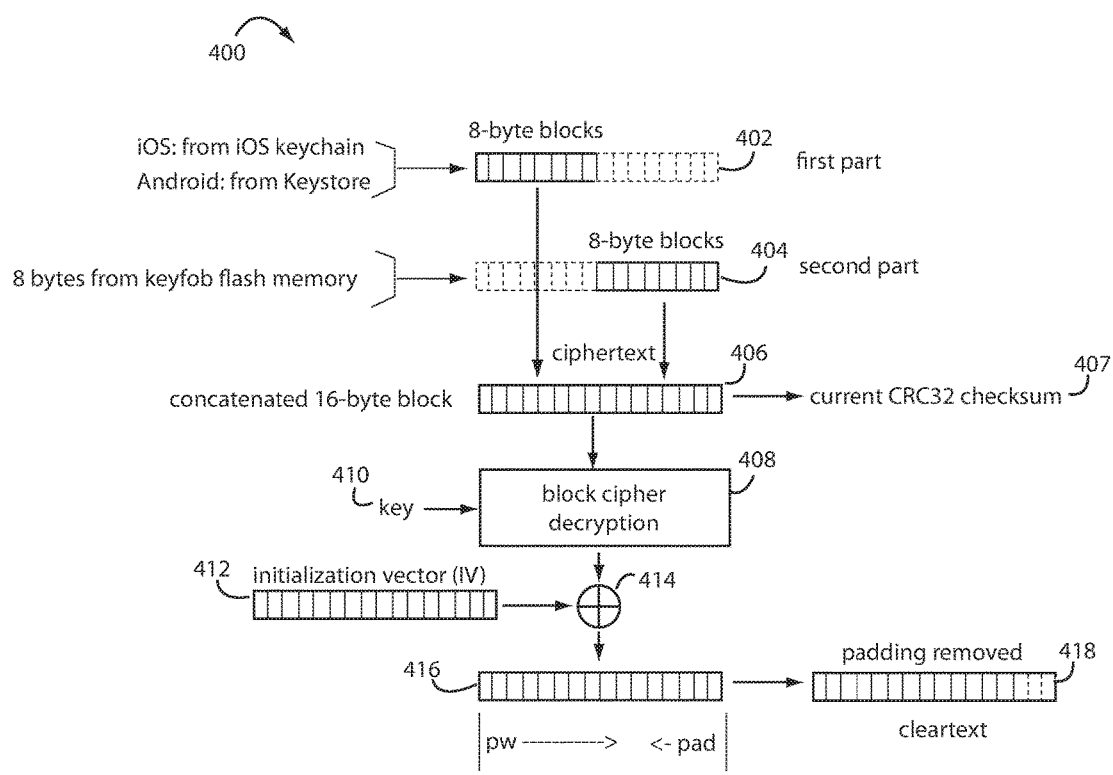

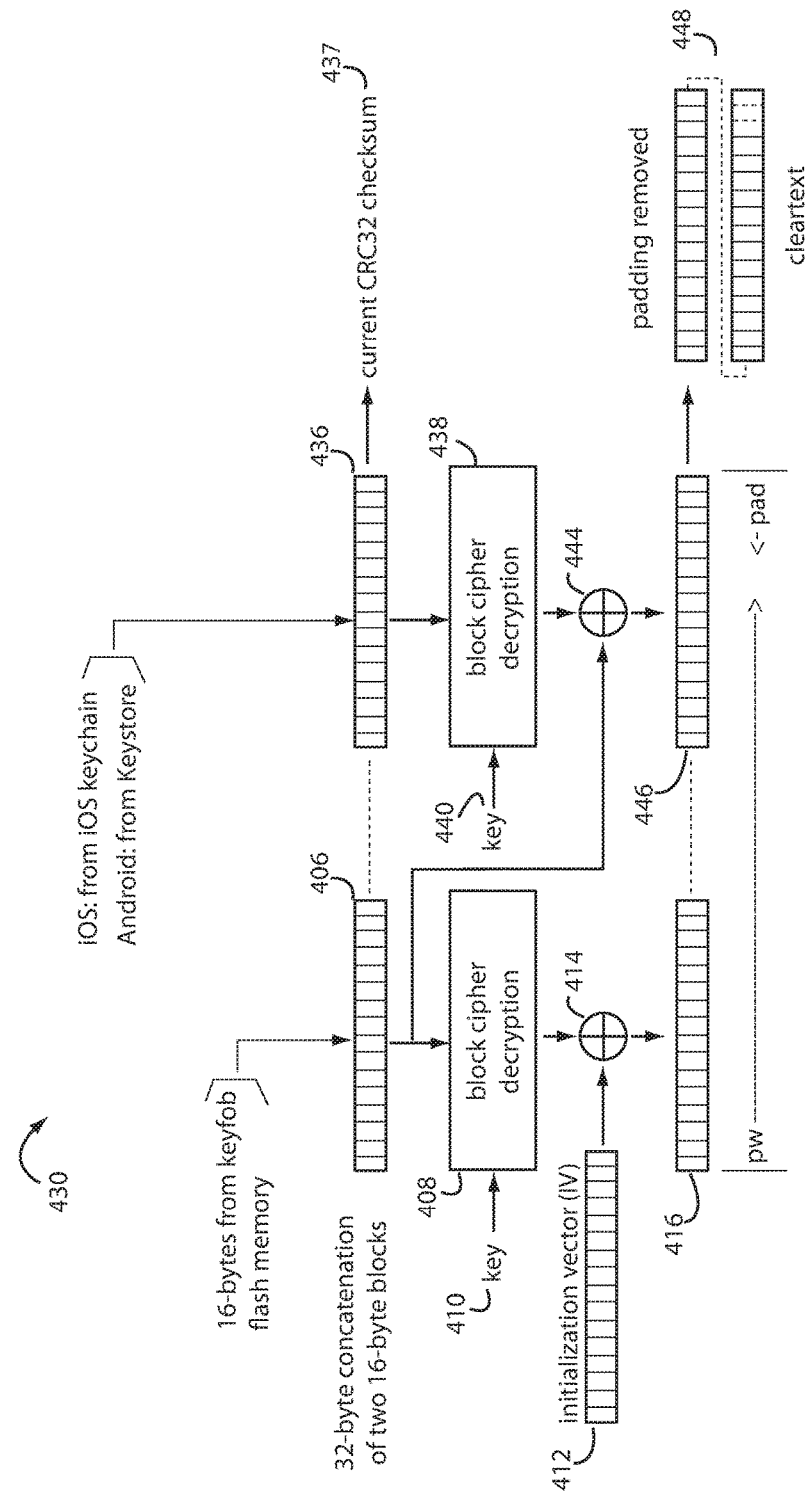

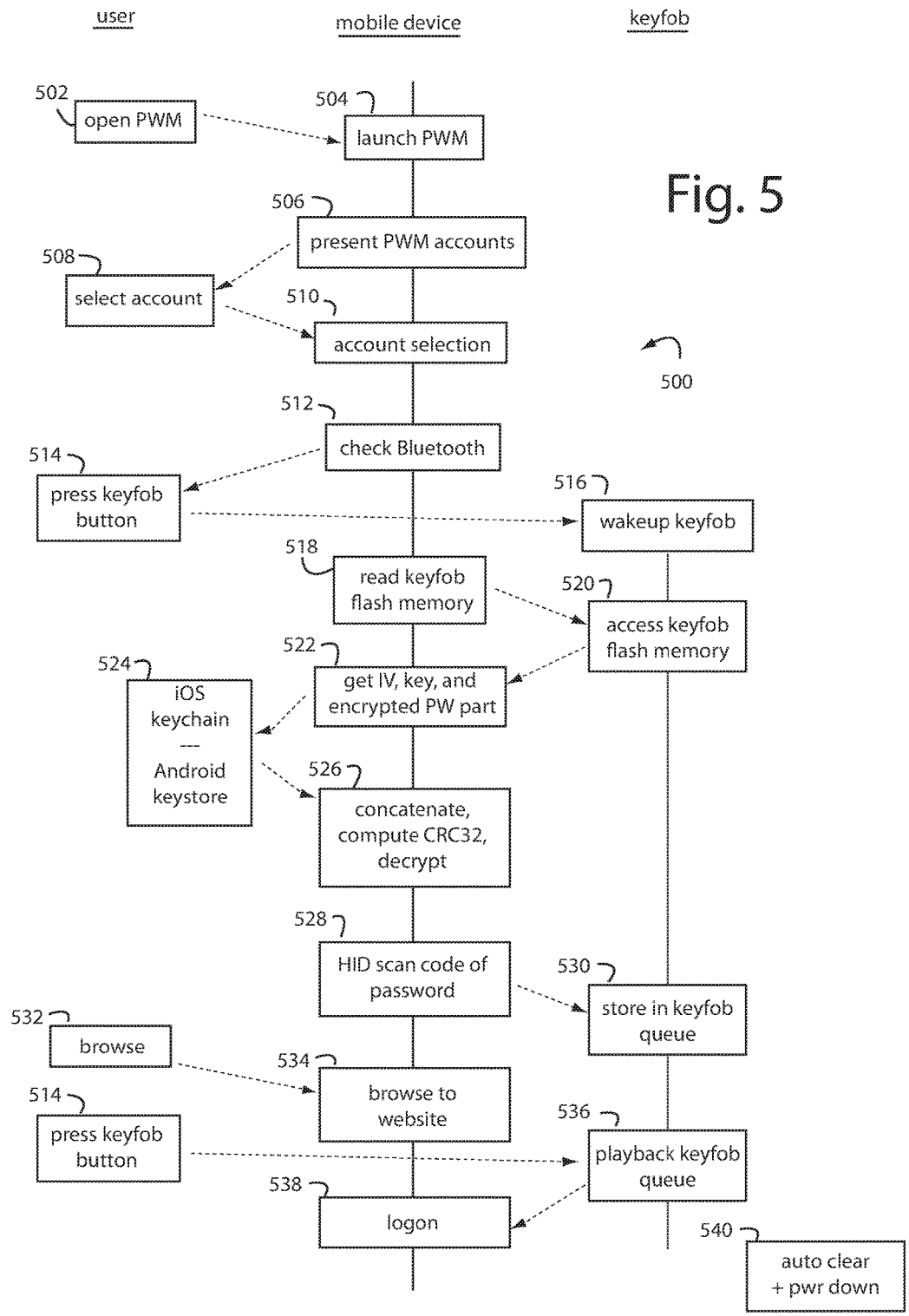

MOBILE DEVICE PASSWORD MANAGEMENT AND ESCROW WITH KEYFOB

BACKGROUND

1. Field of the Invention

The present invention relates to security methods and equipment applied to mobile device applications with multi-factor authentication, and more particularly to password management mobile apps that escrow each encrypted password stored in two physical locations and keep one of those parts in a separate user gadget like a keyfob.

2. Description of the Problems to be Solved

Passwords are universally required of us users to access our secure websites because they are an effective way to deny access to crooks and other unauthorized persons. But fraudsters have gotten so good at guessing or obtaining simple passwords that these secure websites are now all demanding we choose very complex phrases. These complex phrases can, however, be hard to remember accurately. And security professionals recommend we choose different passwords for each different secure website.

Password manager mobile applications recognize that these fraudsters are intercepting our passwords after they leave our devices. Some fraudsters can sniff the Internet links and others are capable of breaching the secure websites themselves to steal the sensitive data they store about their authorized users.

So several password manager mobile applications have been commercially developed that require the user to remember only a single "master password" and the password manager mobile application itself deals with dozens of complex passwords that correspond 1:1 with dozens of secure websites. Just to be sure these dozens of complex passwords are secure in the user device, these are encrypted locally under the master password in a "vault".

What is needed of a password manager in a mobile app is to address the key problems of malware and future security vulnerabilities.

SUMMARY OF THE INVENTION

Briefly, physical security method and equipment embodiments of the present invention are applied to mobile devices that use multi-factor authentication mobile apps with login dialogs. Herein, a password management mobile app physically escrows each encrypted password that must be stored into two parts. These are then distributed between two separate, independent physical devices. Only one of those parts is kept only in a separate user gadget like a keyfob. Any reconstitution of each password after decryption requires that the user have on-hand both the mobile device and the separate user gadget. Such reconstitution is one password at a time, and only as needed, and released for use in remote authentication with a master user password entry.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 2 is a flowchart diagram of a typical login sequence for the mobile device and keyfob of FIG. 1;

FIGS. 3A and 3B is a functional block diagram of a Cipher Block Chaining encryption logic that can be used by the method of FIG. 2 to encrypt whole passwords and store their parts;

FIGS. 4A and 4B are functional block diagrams of a Cipher Block Chaining decryption logic that reverses the encryption of the logic of FIGS. 3A and 3B;

FIG. 5 is a flowchart diagram of a password decryption and playback method for the mobile device and keyfob of FIG. 1.

DETAILED DESCRIPTION OF THE PREFERRED EMBODIMENTS

The storage and retrieval of sensitive information and other user activity on infected mobile devices can be surreptitiously monitored by malicious apps (malware). Escrowing the sensitive information is the principal countermeasure used herein to significantly reduce the exposure times such data is vulnerable on the phone. Embodiments of the present invention escrow the sensitive data to a keyfob. This severely limits when sensitive information on the mobile device is present, whole, and in-the-clear to the brief moments of password creation, and later to the infrequent moments they're needed and called into use.

Passwords in these embodiments are kept unavailable during long-term, idle storage, the very times when they would otherwise be the most vulnerable. They are unavailable because they are physically escrowed with an external device, e.g., a keyfob. Such also curbs the kind of security vulnerabilities that can arise in the future in keychain/keystore services in the mobile device's operating system. If an exploit becomes known to keychain services, for example, the risk of exposure is kept greatly reduced because exploiting keychain services isn't enough without the keyfob to reconstruct any passwords.

Multi-factor authentication (MFA) is a computer access control method in which a user gains access only after successfully presenting several separate pieces of evidence to an authentication mechanism, e.g., at least two of knowledge (something they know), possession (something they have), and inherence (something they are). Here, the something the user has comprises two things, a mobile device and a keyfob. The something the user knows is a password. So, embodiments of the present invention physically store a unique password for each authentication mechanism of several websites so only one master password is required of the user. Such storage is afforded a degree of physical security by escrowing an encryption of each unique password between the mobile device and the keyfob.

Figure 1:
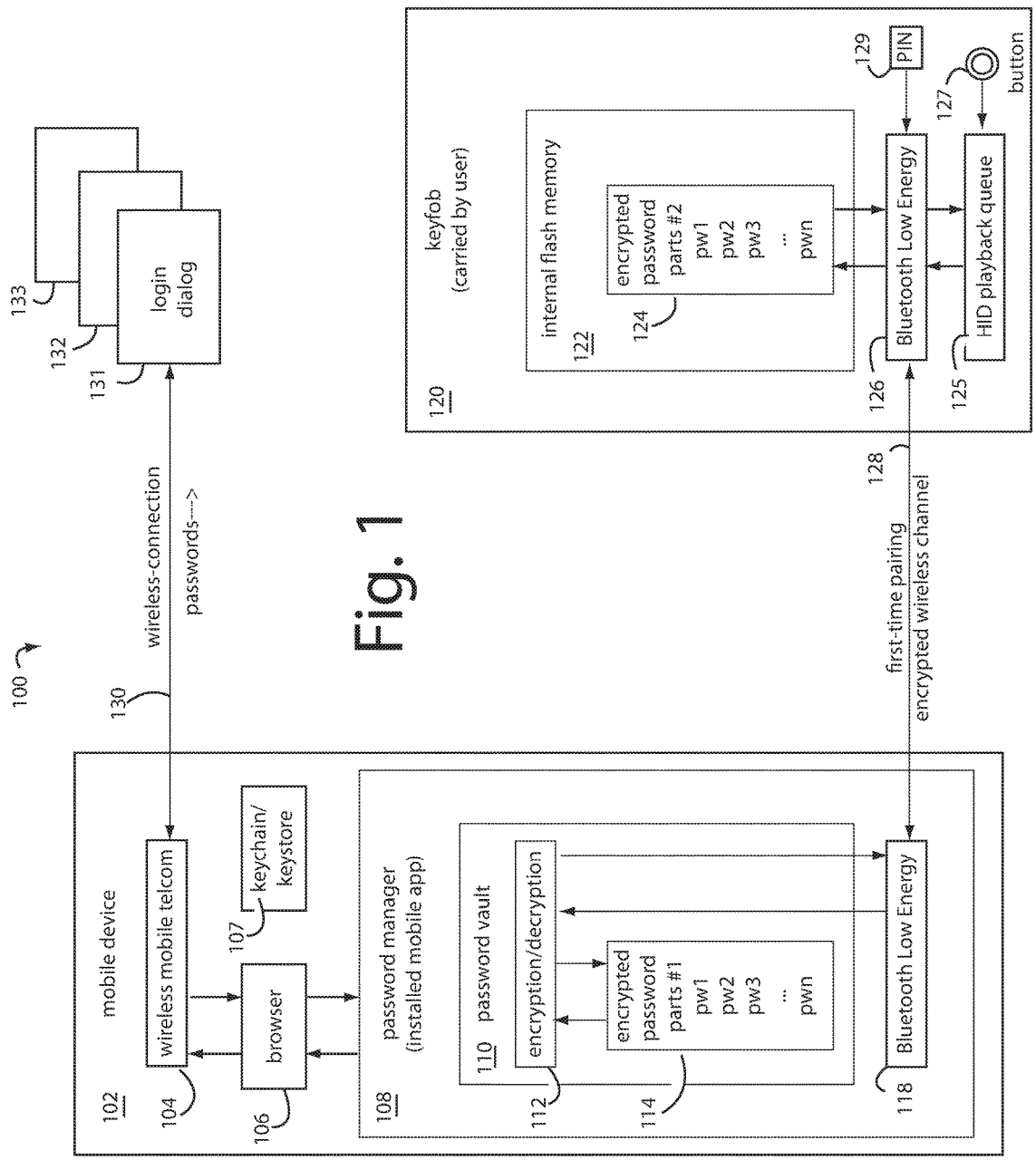
FIG. 1 is a functional block diagram of a mobile device and keyfob that are together capable of strong, multi-factor authentication (MFA) for login dialogs with mobile apps and mobile app login dialog access over the Internet.

FIG. 1 represents a mobile, secure access system 100 that includes a mobile device 102 with wireless mobile telecommunications. A browser 106 displays on the mobile device 102 and is provided for navigating the Internet and logging onto mobile app login dialogs. Our solutions extend beyond the simple mobile browsing of remote web sites. In reality, a large majority of users will be working through a mobile app provided from their banks and credit card companies. The present invention therefore is intended to work with any login dialog a user would normally be presented with, whether it be from the more common mobile app, or the less common web site.

A keychain/keystore 107 provides safe data storage in the iOS and Android operating systems. A password manager mobile app 108 is installed and executed on the mobile device 102. Such includes a password vault 110 implemented in local storage on the mobile device. An encryption/decryption process 112 operates to store the second half of several mobile app login dialog passwords pw1, pw2, pw3, ... pwn in their encrypted forms in said password vault 114.

A Bluetooth Low Energy (BLE) transceiver 118 is used to communicate with a keyfob 120. The first half of several mobile app login dialog passwords pw1, pw2, pw3, ... pwn are stored in their encrypted forms in keyfob 120. More specifically, the data are stored in a non-volatile internal flash memory 122 as encrypted password parts 124. A keyboard HID playback queue 125 holds industry-standard scancodes for each keystroke comprising the password ready for transmission. The Bluetooth Low Energy transceiver contained in the keyfob 126 pushes the passwords, when triggered by a user pushbutton 127, back over an encrypted BLE wireless channel 128, then over a 4G, Wi-Fi, or other wireless connection 130 to a selected one of several different mobile app login dialogs 131-133 on the Internet, for example.

Currently, Bluetooth pairing with personal identification numbers (PINs) are a necessary measure to avoid a published Bluetooth Low Energy (BLE) security issue with the "Just Works" pairing mode. However, such issue is expected to be only a temporary one. As such, the "Just Works" pairing mode, is only slightly relevant to the invention. In fact, the latest revision of BLE fixes the security issue. However the majority of phones, tablets, and other devices currently on the market run the previous version of BLE, and cannot yet benefit from the fix. When the latest BLE standard becomes widely adopted in consumer products, the keyfob's firmware would be easy enough to update to no longer require PIN codes for pairing. So as of now, any Bluetooth pairing of keyfob 120 must not employ the automatic, "Just Works" mode, because that mode is vulnerable to an eavesdropping attack and thus is insecure. Instead, as a countermeasure, every first-time pairing requires a keyfob 120 specific hardcoded PIN code 129 to be entered by the user via mobile device 102. That way, only the user's one keyfob 120 will interplay with mobile device 102 later and not with an uninvited stranger.

It is important here to clarify that any decrypted passwords are immediately converted to Bluetooth Human Interface Device (HID) keyboard protocol scancodes, and are then sent to the keyfob's queue in cleartext over a securely encrypted BLE connection between keyfob and mobile device. Such connection between the keyfob and mobile device is first negotiated during the initial pairing process, and such pairing is maintained for every future connection between the devices. The process is similar, in general, to the WPA encryption ubiquitously used in Wi-Fi connections, even though here cleartext is being sent over the air. The sensitive data isn't visible to wireless eavesdroppers in either case.

The keyfob 120 doesn't do any encryption or decryption itself. The encryption/decryption process 112 implemented within mobile app 108 handles all password encryption and decryption, the escrowing of encrypted passwords into parts, the recombining of them, and coordination through encrypted BLE wireless channel 128 to keyfob 120. Commands issued via BLE 118 and 126 over BLE paired channel 128 instruct data 124 to be stored or retrieved from internal flash memory 122. Only parts of encrypted passwords are stored on keyfob 120.

A first-time storage of encrypted password parts on keyfob 120 will occur automatically, either as a new account is added, or by choosing to resync in mobile app 108. The keyfob 120 need not care that the data stored is encrypted data. As a result of the physical separation of encrypted password parts between mobile device 102 and keyfob 120, losing one or the other will be enough to prevent a compromise of any account.

The electronics described as contained here in keyfob 120 need not be necessarily implemented in a familiar keyfob form. Such electronics could be usefully employed in a watch, ring, bracelet, or belt, for example. The objective is to place such electronics in a gadget that a typical user would normally carry, but that is not itself physically tethered to the mobile device 102.

FIG. 2 represents a typical login sequence 200 that begins with a step 202 in which the user opens password manager 108 on mobile device 102 in step 204. In a step 206 and 208, the user unlocks manager vault 110 and access to encrypted password parts 114 by entering master password. (Such is chosen at vault creation.) In a step 210 and 212 the user selects an account they wish to log into. The user is instructed in a step 214 and 216 to press button 127 on keyfob 120. This causes the BLE 126 to turn on in a step 218 and connect to mobile device 102, assuming a previous first-time pairing with a keyfob 120-unique PIN 129 had succeeded. In a step 220 mobile device 102 requests an encrypted password part. A step 222 fetches it from memory 124 for a selected account and sends it back in a step 224.

The encrypted password parts 114 and 124 are reassembled in vault 110 in a step 226. The cipher functions 112 of the password manager then decrypt the recreated whole passwords using a secure-random per-account key previously stored in the mobile device 102, using, e.g., keychain (iOS), keystore (android), or other. In a step 228 and 230, mobile device 102 sends the decrypted password as cleartext scancodes to keyfob 120 for temporary keeping in keyboard HID playback queue 125. Such is held ready for playback as a HID device.

In a step 232 the user opens the particular mobile app that corresponds to a site's login credentials 131-133. A step 232 opens to present the site's user ID and password dialog. The user taps the password field in a step 234 to select it for entry of the password that was queued in keyfob. If app/site "remembers" username, button press 236 on keyfob 120 simply plays back cleartext password 238 using Bluetooth HID keyboard protocol as scancodes 240, and erases the scancodes from password queue upon automatic power-down (after a period of inactivity). User is now logged into mobile app/site. Optionally, mobile app can send username, tab, and cleartext password to password queue on keyfob 120, for apps/sites which don't "remember" usernames.

FIG. 3A represents a logic 300 that can be used by method 200 (FIG. 2) to encrypt whole passwords and store their parts. A variable length password 302 is padded up to result in a fixed 16-byte padded password 304. (Most passwords 302 will be 16-bytes or less.) A pseudorandom generator 306 produces an initialization vector (IV) 308 and a key 310. A logical-XOR 312 combines the IV 308 and fixed 16-byte padded password 304 for a block encryptor 314. This produces a 16-byte ciphertext 316 that is separated into a first 8-byte part 317 and a second 8-byte part 318. The second 8-byte part 317 is sent to either an iOS keychain or Android Keystore 107. The first 8-byte part 318 is stored in the keyfob flash memory 122.

Figure 3B:
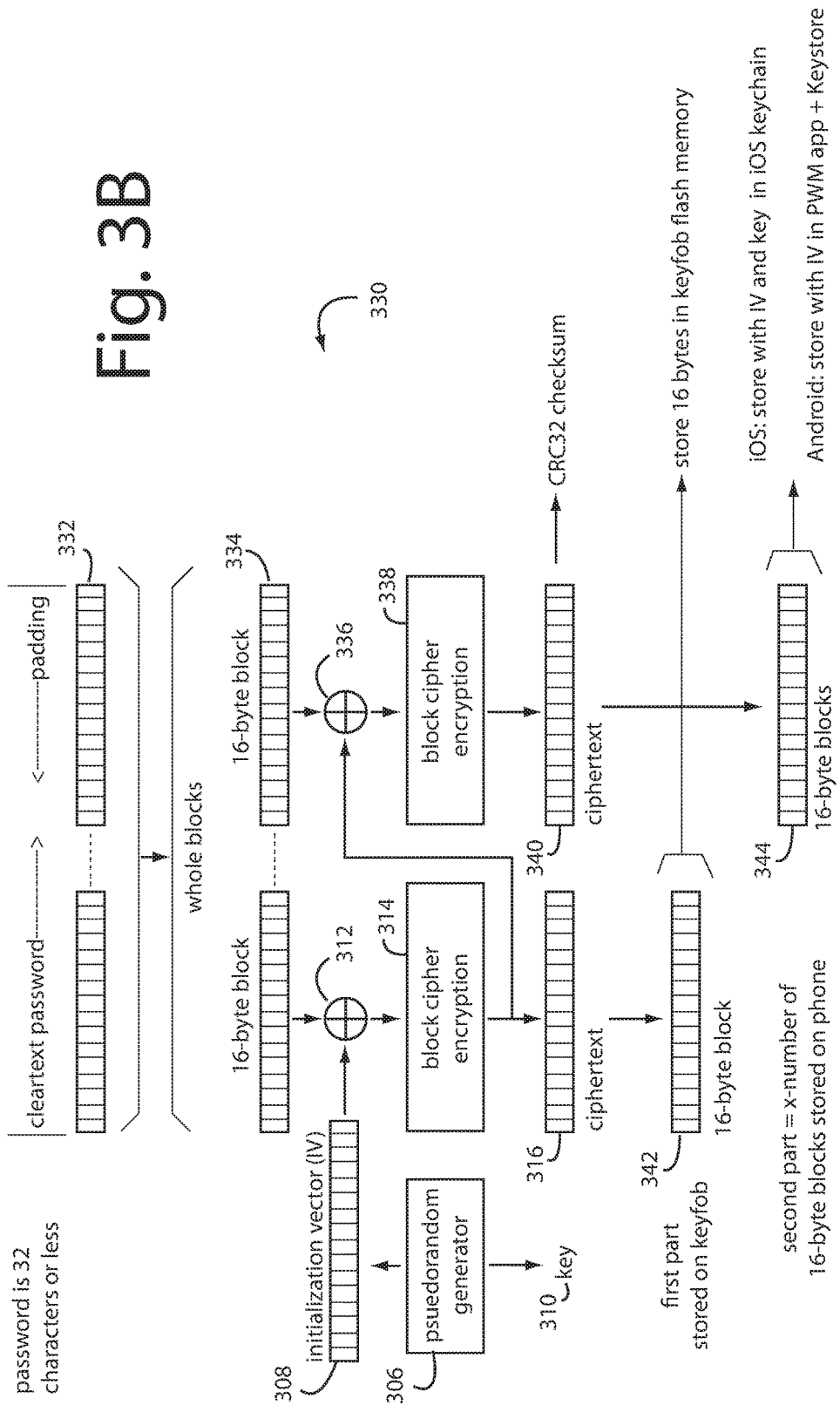

FIG. 3B represents a logic 330 that is used to further encrypt whole passwords 32-characters or less and store their ciphertext parts. A variable length 17-32 character password 332 is padded up to result in a doubled 16-byte block padded password 334. A logical-XOR 336 combines 16-byte block ciphertext 316 and a fixed 16-byte padded password part 334 for a block encryptor 338. This produces a 16-byte ciphertext part 340. A CRC32 checksum is computed for parts 316 and 340 taken together, for later use in a decryption integrity test. A first 16-byte part 342 is stored in the keyfob flash memory 122. A second 16-byte part 344 is sent for safekeeping to an iOS keychain or Android Keystore 107.

FIG. 4A represents a decryption logic 400 that reverses the encryption of logic 300 (FIG. 3A). A second 8-byte ciphertext part 402 is fetched from either an iOS keychain or Android Keystore 107. A first 8-byte part 404 is fetched from the keyfob flash memory 122. These are concatenated into a 16-byte ciphertext block 406. A CRC32 407 is computed from such. A block cipher decryptor 408 inputs a key 410 from either an iOS keychain or Android Keystore 107. An IV 412 from either an iOS keychain or Android Keystore 107 combines in an XOR-logic 414 to recover the original padded password 416. Any padding is removed to yield an original password 418 in cleartext.

FIG. 4B represents a decryption logic 430 that reverses the encryption of logic 330 (FIG. 3B) for passwords 17-32 bytes long. The first 16-byte ciphertext part 406 is fetched from the keyfob flash memory 122. A second 16-byte part 436 is fetched from an iOS keychain or Android Keystore 107. These two parts are concatenated into 32-byte ciphertext block from which a CRC32 checksum 437 is computed for integrity testing and compared to CRC32 previously stored on keyfob along with password half. The first block cipher decryptor 408 inputs a key 410 from the iOS keychain or Android Keystore 107. An IV 412 from the iOS keychain or Android Keystore 107 combines in an XOR-logic 414 to recover the first 16-bytes of the original padded password 416. A second block cipher decryptor 438 inputs key 410 from the iOS keychain or Android Keystore 107. The first 16-byte ciphertext block 406 combines in an XOR-logic 444 to recover a second 16-bytes of the original padded password 446. Any padding is removed to yield an original password 448 in cleartext.

FIG. 5 represents a password decryption and playback method 500 that begins in a step 502 when a user opens a password manager (PWM) mobile app that launches in a step 504. The logic described in FIGS. 4A and 4B can be used for playback method 500. A step 506 presents to the user on screen the PWM accounts that are presently available. In a step 508, the user selects an available account for logon. A step 510 sets the account selection in the PWM. A step 512 checks if the Bluetooth is already turned on and paired, if not, the user is instructed to turn it on and establish pairing if needed. The user presses button 127 on the keyfob 120 in a step 514 to wake it up in a step 516. The keyfob 120 will establish any previously arranged pairing.

The password manager mobile app 108 requests, in a step 518, a read of an address in the keyfob flash memory block 122 in a step 520. In a step 522, this accesses data 124 corresponding to the encrypted password part associated with the account entry, along with a previously computed CRC32 checksum for the full encrypted password.

A step 524 has two alternatives. For Apple iOS applications, the initialization vector (IV), key, and the other encrypted password part are conventionally retrieved from its iOS Keychain. For Google Android applications, only the IV and the other encrypted password part are retrieved from the shared preferences of the password manager mobile app. Such key is conventionally retrieved from its Android Keystore.

The two encrypted password parts are concatenated, or otherwise linked together, in a step 526, so a current CRC32 checksum can be computed and compared in an integrity test to the checksum from the keyfob 120 that was previously stored. If the previous and current CRC32 checksums match, the encrypted password as reassembled is considered valid and intact for decryption to proceed with confidence. Otherwise, a retry is attempted to get it right. Failing that, an on-screen error notification for the user is generated.

Next, an advanced encryption standard with cipher block chaining mode (AES-CBC) instance is initialized with the IV and key that were retrieved. The decrypt operation on the reassembled encrypted password therefore uses the AES-CBC instance to yield the original, cleartext password without padding.

Embodiments of the present invention use a Bluetooth protocol standard known as human interface device (HID). Such HID protocol suits all modern mainstream operating systems to recognize keyboards, mice, and other standard USB HID devices without needing a specialized driver. The HID profile defines the protocol between (a) Device (HID), and (b) Host. The Device (HID) services human data with the host. The Host uses or requests the services of a HID. The Bluetooth HID profile includes a HID Descriptor that allows the device's feature set to be defined and controlled, and includes a HID report which hosts read to see the data should be interpreted as ASCII values. These HID reports adopt the standard universal serial bus (USB) HID protocol format to leverage existing host drivers.

The now-decrypted password may be temporarily displayed to the user by the password manager mobile app. As cleartext, such password is converted in a step 528, character-for-character, by the mobile device into HID keyboard scan codes from an industry-standard number table. The HID scan code representation of the cleartext password is readied in a step 530 for immediate export in the keyfob playback queue 125.

The user should then open a mobile app or browse to the site the queued password for the login is needed, all in a step 532. If it isn't automatically remembered by the site, the user next enters a website username, and then taps its input focus in a corresponding password field after browsing to the website in a step 534.

The user presses the button on the keyfob 120, which plays the HID scan codes of the cleartext password, as if it were a wireless keyboard (the phone doesn't know the difference).

The user is logged into desired mobile app or web site in a step 538. The password queue isn't purged until the keyfob powers down, in a step 540.

The keyfob playback queue best remains populated with password's scan codes and so it can be played back again a second time if something went wrong with the first attempt at a login. Such password's scan codes should persist for a thirty to sixty second idle time before the keyfob 120 powers down and the playback queue is automatically purged. This way the user can still replay their passwords in case they fumbled something during the login process, without having to repeat the whole decryption process.

Figure 6:
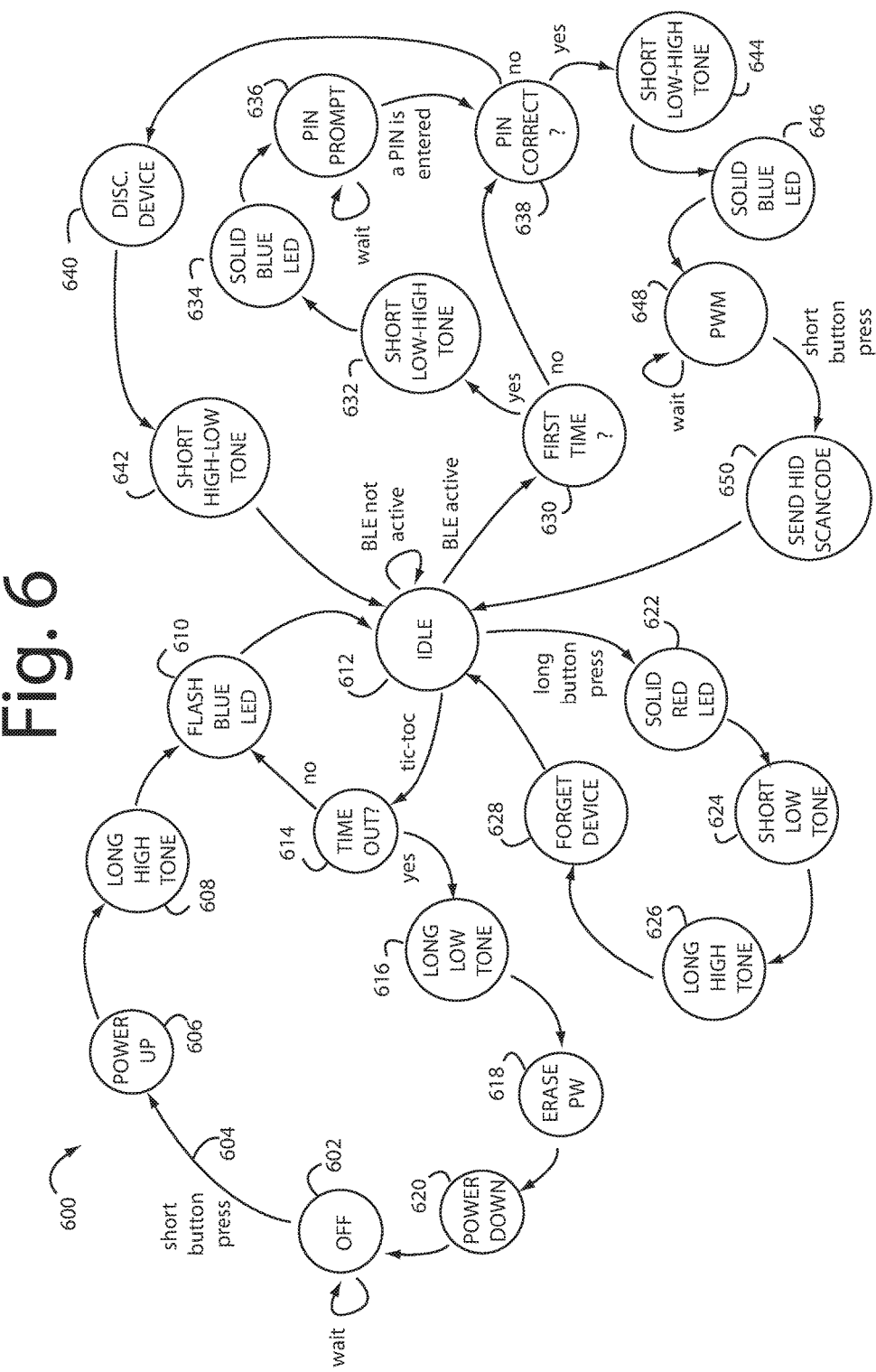
FIG. 6 is a state diagram of normal user operation of the invention.

FIG. 6 represents how a set of LED indicator lights, a status tone beeper, BLE pairing, and a push-button are best interoperably coordinated within a keyfob 600 and even keyfob 120 (FIG. 1), and a cellphone/tablet or other mobile device.

Referring to FIG. 6:

1) From an OFF state 602, a short button-press 604 turns ON the keyfob in a POWER UP state 606. A LONG HIGH TONE is sounded by the beeper in a state 608, and a blue LED is slowly flashed in a state 610 indicating an IDLE state 612. During IDLE, the keyfob awaits a BLE connection.
2) A TIMEOUT state 614 measures if keyfob remains in IDLE state 612 for 30-60 seconds without any event. If yes, a LONG LOW TONE is sounded in a state 616, and the keyfob is returned to OFF 602 through an ERASE PW state 618 and a POWER DOWN state 620. If no, the blue LED is again flashed in state 610 indicating the IDLE state 612 still persists and the keyfob awaits BLE activation.
3) If during the IDLE state 612, a user-initiated long button-press occurs, any previously paired device will be erased or forgotten so another can be paired anew. In a state 622, a momentary SOLID RED LED is followed in a state 624 that beeps SHORT LOW TONE followed in a state 626 by a LONG HIGH TONE to indicate keyfob pairing has been reset. Keyfob then returns to IDLE state 612 and the slow FLASH BLUE LED of state 610.
4) If the Bluetooth BLE is activated on a cellphone/tablet, a state 630 tests for a first-time pairing. If a connection pairing is being initiated with the keyfob, a state 632 emits a short low-to-high status tone, and a state 634 issues a SOLID BLUE LED. On the cellphone/tablet, the user is prompted in a state 636 to enter a particular hardcoded security PIN code. Such hardcoded PIN is unique to each keyfob and would be included along with the keyfob's packaging, requiring the owner to memorize said PIN.
5) If any PIN is entered, a state 638 sees if it is correct. If it is correct, the device remains connected to keyfob. If the PIN entered was incorrect, the device is disconnected by a state 640, and a short high-to-low status tone is beeped from keyfob in a state 642. The action returns to IDLE state 612 with "normal" FLASH BLUE LED via state 610.
6) Otherwise, during IDLE state 612, keyfob will automatically connect via states 630 and 638 to a previously paired cellphone/tablet as soon as its Bluetooth BLE is activated on that device. A short low-to-high status tone is beeped in a state 644, and a state 646 issues a SOLID BLUE LED.
7) The keyfob is now ready for password manager (PWM) play in a state 648, as described elsewhere with FIGS. 1-5. While connected, any short button-press causes a state 650 to SEND HID SCANCODE for a most recently loaded password sequence.
8) When password manager interaction in states 648 and 650 is complete, the Bluetooth BLE on the cellphone/tablet can be deactivated. This will return the keyfob to IDLE state 612, and subject to POWER DOWN state 620 after 30-60 seconds of being idle.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A method to include physical security in multi-factor authenticating password manager mobile apps in mobile devices, comprising:
   padding each of a plurality of passwords having an independently variable-length of text characters into a standardized block length with a password manager mobile app executing in a mobile device;
   encrypting each one of the plurality of passwords in a padded standardized block length with a block cipher with the password manager mobile app executing in the mobile device;
   escrowing a set of blocks for each of the plurality of passwords resulting after encryption into first and second parts with the password manager mobile app executing in the mobile device;
   storing only the first parts in a physically separate device and only the second parts in the mobile device, and connecting the first parts and the second parts together by the password manager mobile app executing in the mobile device; and
   reconstituting each password one at a time, only as needed, for use in a remote website authentication via the password manager mobile app, and the mobile device, on release for the remote website authentication with a master user password entry by the user.

2. The method of claim 1, wherein the reconstituting further comprises:
   selecting one of the first parts in the mobile device, and selecting a corresponding one of the second parts in the physically separate device for concatenation and decryption, and then fetching, concatenating, and decrypting both into a whole password with the password manager mobile app executing in the mobile device.

3. The method of claim 2, further comprising:
   staging the whole password after reconstitution in a keyboard queue in the other physically separate device until the whole password is released for transmission to a mobile app login dialog as authentication by a press of a user pushbutton.

4. The method of claim 1, further comprising:
   connecting together the first parts in the physically separate device and the second parts in the mobile device with a wireless, Bluetooth Low Energy (BLE) link.

* * * * *